(12) United States Patent
Cooper

(10) Patent No.: US 6,635,145 B2
(45) Date of Patent: Oct. 21, 2003

(54) PACKAGING FILLER PRODUCT

(76) Inventor: Andrew Cooper, 7931 Deering Ave., Canoga Park, CA (US) 91304

( * ) Notice: Subject to any disclaimer, the term of this patent is extended or adjusted under 35 U.S.C. 154(b) by 43 days.

(21) Appl. No.: 09/877,765

(22) Filed: Jun. 11, 2001

(65) Prior Publication Data

US 2002/0187287 A1 Dec. 12, 2002

(51) Int. Cl.$^7$ .............................................. B65B 61/00
(52) U.S. Cl. ................... 156/441.5; 156/442.2; 156/466; 156/497; 156/510; 156/544; 156/147; 156/156; 156/267; 156/290; 156/292; 156/308.4; 53/472; 53/562
(58) Field of Search ................................. 156/147, 156, 156/203, 218, 267, 290, 292, 308.4, 441.5, 442.2, 466, 497, 515, 543, 544; 53/472, 562; 410/119

(56) References Cited

U.S. PATENT DOCUMENTS 5,340,632 A * 8/1994 Chappuis .................... 428/71

6,217,689 B1 * 4/2001 Gehret ........................ 327/67
6,375,785 B1 * 4/2002 Aquarius .................... 156/252
2002/0094393 A1 * 7/2002 Matarasso .................. 428/34.1

* cited by examiner

*Primary Examiner*—Sam Chuan Yao
(74) *Attorney, Agent, or Firm*—Roger A. Marrs

(57) ABSTRACT

A packaging filler product and machine for making the product wherein the product includes an air-filled pouch having sealed edges and spots connecting the opposing sheets of the pouch together. The machine includes a frictional belt system for gripping a bulk supply of pouched package material and that urges the bulk material past an inflation device for serially introducing air to the interior of each pouch of the package material followed by employing a heater that heat seals the opening into the interior of each pouch. A trim cutter eliminates unnecessary material and individual pouches are separated from the bulk supply by using perforations provided between adjacent pouches. A feed mechanism including the belt system is provided for moving the bulk supply of pouches from a supply spool past the heater and through the trim cutter. Tensioning and idle rollers guide the bulk supply of pouches through the machine in an in-line series.

6 Claims, 3 Drawing Sheets

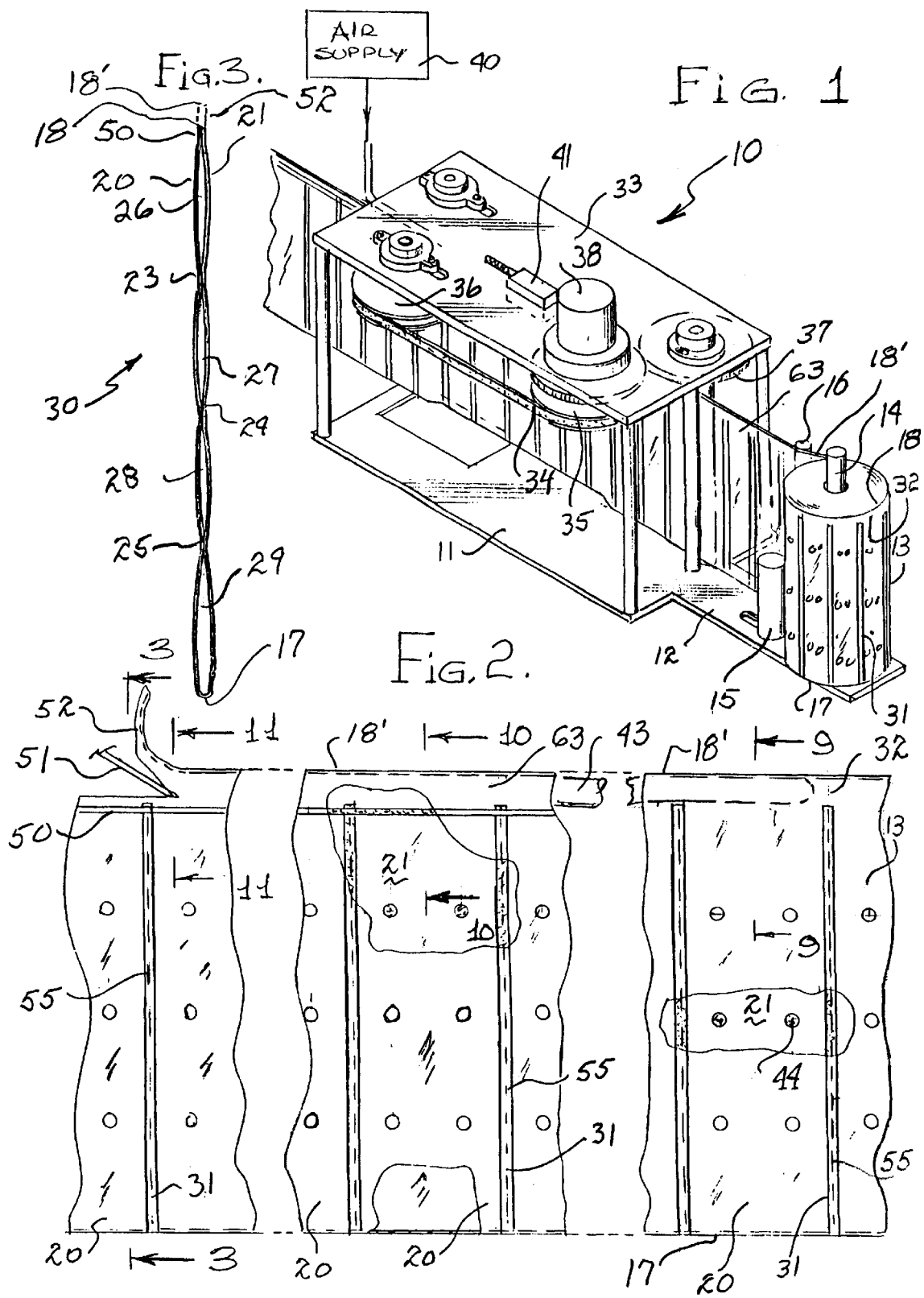

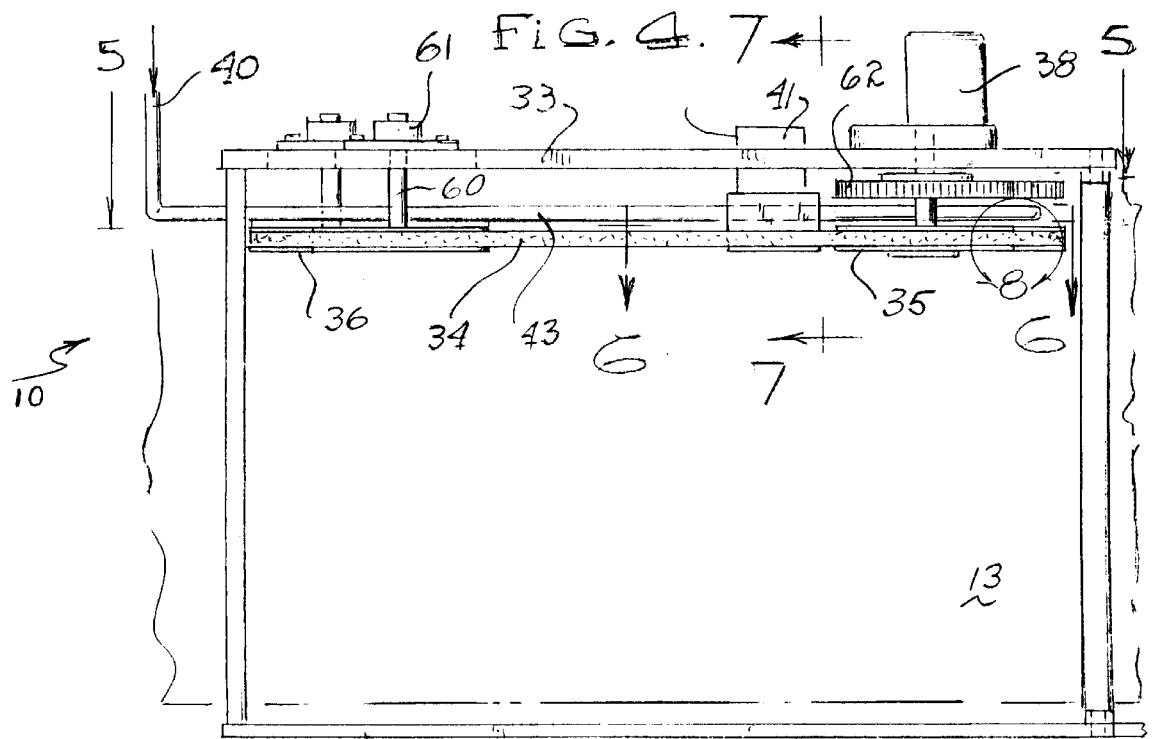
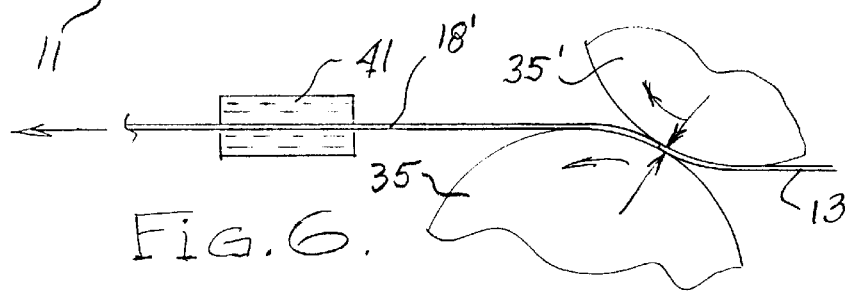
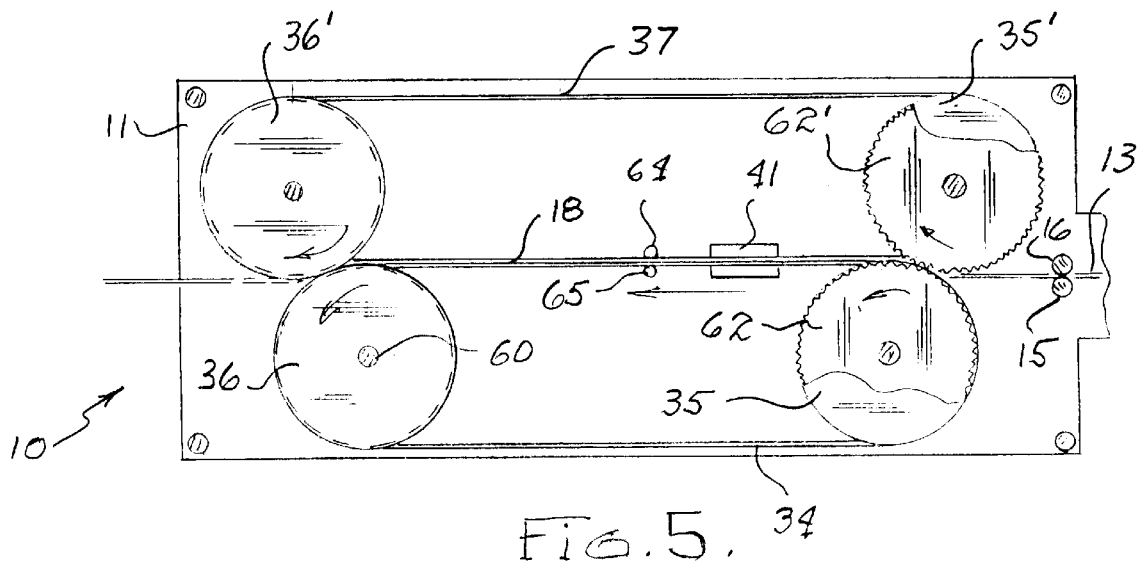

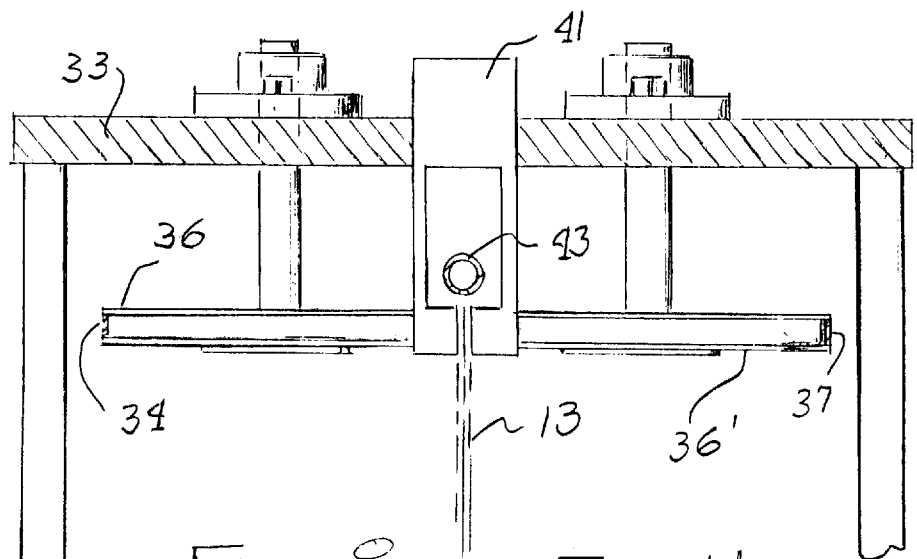
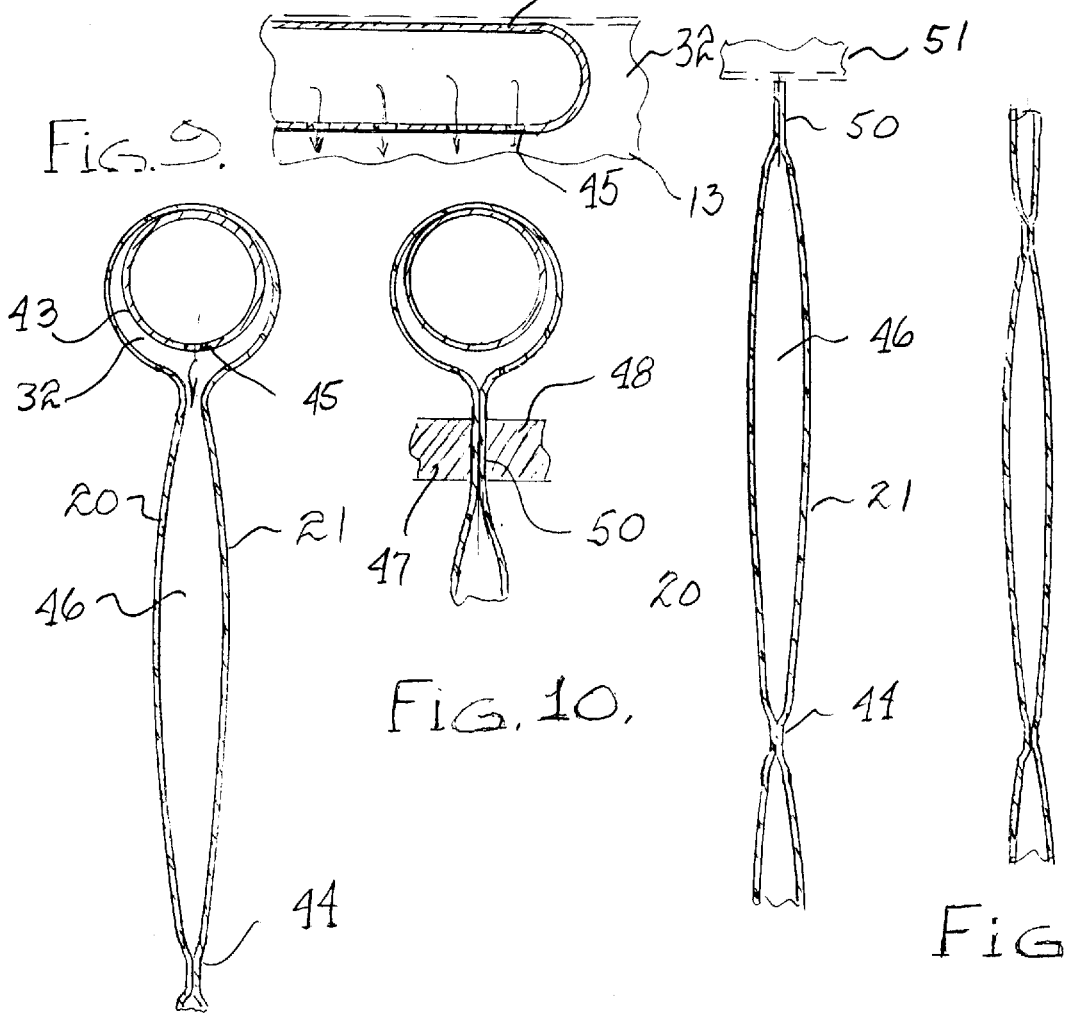

PACKAGING FILLER PRODUCT

BACKGROUND OF THE INVENTION

1. Field of the Invention

The present invention relates to the field of packaging materials, and more particularly to a novel package filler material having shock-absorbing capabilities and a machine for making such packaging filler material whereby the user may readily dispense, on site, a quantity of such filler material from a machine which fabricates the filler material in the form of inflated pouches or cells detachably connected together in an in-line series.

2. Brief Description of the Prior Art

In the past, it has been the conventional practice to provide a packaging material composed of small masses of foam composition, such as composed from polystyrene or polyethylene. Such packaging material is used as fillers or stuffers in a compartment so as to protect fragile products when transported from one place to another either by commercial or government handling authorities. Such plastic-like pieces of foam are sometimes referred to as "peanuts" because of their peanut-like shape, and in other instances, the foam composition is of irregular form or of special form conforming in shape to the article being transported in the carton. In the instance of "peanuts", such foam composition is purchased in large bags which are kept in inventory at the site of shipment until ready for usage. This represents a relatively uneconomical means for such packaging material since it requires space for storage and must be purchased before usage from outside sources. In some instances, problems have been encountered by the receiver of packages containing such conventional foam material which stem from disposal problems since some plastic foam compositions are not acceptable for recycling procedures.

Another prior packaging material takes the form of a unitary sheet having a multiplicity of integrally formed air bubbles that are connected together on the sheet and not separable. Such sheets are manufactured off-site from their location of use and are generally stored in rolls at the location of use after purchase and supply by the manufacturer. Also, the user must either fold the sheet to fit the article to be shipped, or specifically cut the sheet to accommodate the package.

Most all presently available package fillers such as "Popcorn", "Peanut" or "Bubble-Wrap" are made in factories requiring vast floor space to manufacture and inventory the volume of products for distribution. This procedure requires further energy as well as other resources that are wasted. Shipment and distribution require packing in spools, storage bags or the like.

One attempt to provide on-site fabrication machinery for producing a quantity of shock-absorbing cells is disclosed in U.S. Pat. No. 5,216,868. Although successful for the machinery's intended purposes, the machine requires considerable moving parts, timing functions and control stations. These create problems and difficulties that need to be avoided for on-site manufacture of package filler materials.

Therefore, a long-standing need has existed to provide a novel packaging material which need not be stored in inventory at the point of manufacture and shipment, but which may be fabricated by the user on-site at the time that such material is needed. The on-site fabricated product will not only protect the object being shipped in the carton or package but can be disposed of by the recipient once the package has been opened and the shipped article removed. Furthermore, such a desired packaging material must be relatively inexpensive to manufacture as compared to foam or foam-like compositions.

SUMMARY OF THE INVENTION

Accordingly, the above problems and difficulties are obviated by the present invention which provides a novel packaging filler material comprised of an inflated pouch or cell defined between opposing surfaces of plastic-like material sheets that are joined about their peripheral edges in a sealed manner. Such a pouch or cell may be manufactured at the site of use by a novel machine which produces the pouches or cells in a serial fashion separable by a perforated means for detaching adjacent ones of the cells from each other at the selection of the user, depending on his shipping requirement. Such a machine includes a tubular source of plastic sheet material that is heat sealed along its length in spaced-apart perforated strips so that a plurality of pouches or cells is defined between the strips. The perforated heat sealed strips define the sides of each pouch or cell while the bottom is closed by a fold of the sheet material with the top of the pouch or cell open for receiving air intended to fill the pouch or cell. A common conduit communicates with the open end in each pouch or cell for insertably receiving an inflation device. A belt system grips the plastic tubular sheet material and moves the material through the machine past the inflation device, through a heater for sealing the pouch or cell and past a trimming means for severing scrap or waste material. Individual pouches or cells may be separated from the bulk sheet material by separating the selected pouches or cells along the perforated strips.

In one form of the machine, the tubular supply of plastic material with pre-formed pouches or cells is fed to a machine timed so that multiple stations will effect inflation of each pouch or cell followed by sealing each pouch or cell at spaced intervals along its length to define a plurality of inflated pouches or cells and which provides additional means for providing a detachment or separation between adjacent ones of the pouches or cells so that upon discharge, the strip may be separated into one, two, three or more inflated pouches or cells at the selection of the user. In one form of the invention, the sealing means may be a heat treatment process while the detachable or separation means may take the form of perforations or a slit provided between adjacent ends of the respective inflated cells.

Therefore, it is among the primary objects of the present invention to provide a novel packaging or filler material which is an inflated pouch or cell and which may be combined with other separate pouches or cells to form a shock-absorbing and stuffing material to be carried in cartons or shipping containers about an object to be transported.

Another object of the present invention is to provide a novel packaging material that may be readily produced at the site of shipping and which may comprise one or more air-filled pockets or cells in a strip for use in the shipping process.

Another object of the present invention is to provide a novel machine for producing a series of air-filled pouches, pockets or cells in a strip so that the user may dispense as many cells as required for shipping purposes.

Still a further object of the present invention is to provide a novel machine for producing a package material that is produced from a continuous series of pouches that are initially inflated and sealed to enclose air, followed by dividing the air-filled pouches into a plurality of inflated pouches in an end-to-end relationship and which includes means for cutting scrap material away.

Another object relates to the disposal of the inventive pockets or cells that permits ready deflation and destruction of used material for environmental purposes such as recycling.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 is a perspective view showing the novel machine for producing package filler materials and products;

FIG. 2 is an enlarged fragmentary view of a tubular plastic material being fed through the machine of FIG. 1;

FIG. 3 is a transverse cross-sectional view of an inflated and sealed pouch or cell in accordance with the present invention as taken in the direction of arrows 3—3 of FIG. 2;

FIG. 4 is a side elevational view of the machine shown in FIG. 1 illustrating the belt drive for moving the bulk tubular plastic material through the machine;

FIG. 5 is a sectional view of the machine shown in FIG. 4 as taken in the direction of arrows 5—5 thereof;

FIG. 6 is a sectional view of the belt drive and heater device shown in the direction of arrows 6—6 of FIG. 4;

FIG. 7 is a transverse cross-sectional view of the machine shown in FIG. 4 as taken in the direction of arrows 7—7 thereof;

FIG. 8 is an enlarged fragmentary view, in section, of the inflation means used in the machine shown in FIGS. 1 and 4, as indicated by the arrows 8—8;

FIG. 9 is a transverse cross-sectional view of the inflation means and tubular plastic filler product as shown in FIG. 2 taken in the direction of arrows 9—9 thereof;

FIG. 10 is a view similar to the view of FIG. 9 as taken in the direction of arrows 10—10 of FIG. 2;

FIG. 11 is a fragmentary sectional view of the tubular filler material in its inflated condition taken in the direction of arrows 11—11 of FIG. 2; and FIG. 12 is an enlarged sectional view of the tubular inflated filler product after trimming.

DESCRIPTION OF THE PREFERRED EMBODIMENT

Referring to FIG. 1, the novel package filler material producing machine is indicated in the general direction of arrow 10 which includes a base 11 having an extension 12 at one end which supports a roll of bulk filler material, indicated in general by numeral 13 on a spool 14. A pressure roller 15 is adjustably carried on the extension 12 and bears against the bulk material 13 during the process of forming the filler material. A tension rod 16 is also employed to maintain the material during taut condition as it is being moved through the machine 10.

The material 13 is indicated in cross-section in FIG. 3 which illustrates that the material is tubular having a folded lower end 17 and a folded upper end 18 with opposing sheets 20 and 21 constituting the opposite side sheets of the resultant package. After formation and inflation, material is stripped from the upper end 18 and the end is heat sealed to maintain air within the interior compartment of the pouch or cell. The side sheets 20 and 21 are joined together in fixed spaced-apart relationship by heat seal spots, such as spots 23, 24 and 25. Therefore, air is trapped within the interior compartment as represented between the heat seal spots by numerals 26, 27, 28 and 29. The resultant product is broadly indicated by arrow 30.

FIG. 1 also illustrates that transverse heat seal strips are provided between the upper and lower folds 17 and 18 of the bulk sheet material and such a heat seal strip is indicated by the numeral 31. It is to be particularly noted that the lower end of each strip terminates adjacent to the bottom fold 17 while the upper end of each strip terminates in fixed spaced-apart relationship with respect to the uppermost end or fold 18. Therefore, a hollow conduit is provided immediately beneath the fold 18 and the upper end of the strips 31. The conduit is indicated by numeral 32.

The machine 10 includes a support 33 on which is mounted a belt drive system for moving the bulk tubular material from the wheel 14. The belt drive system includes a continuous belt 34 which is supported beneath the support plate 33 by means of a drive pulley 35 and a driven pulley 36. A pair of drive belts are provided with one belt driven by a motor 38 via the pulley 35. The other belt is indicated by nemeral 37 which is trained about pulleys in similar fashion to the pulleys 35 and 36. The belts 34 and 37 reside on a horizontal plane and are arranged so that opposing portions of each belt grip or grab the opposite sides of the upper edge marginal region of the bulk tubular material 13. Therefore, rotation of pulley 35 by the motor causes belt 34 on one side of the bulk material and belt 37 on the opposite side of the bulk material to rotate causing their opposite linear sections to pull the sheet material from the spool 14.

In order to provide inflation and sealing, an air supply 40 is provided which will place air into the conduit 32 and a heat sealing device 41 is carried on the support 33 for sealing the respective open compartments of the pouches or cells during processing.

Referring to FIG. 2, it can be seen that the bulk sheet of tubular plastic material 13 is initially introduced to an air tube 43 which introduces air, under pressure, to the interior of the tubular material. The air tube 43 is inserted into the conduit 32 which is defined between the upper ends of the plurality of strips 31 and the fold line 18' representing the upper end of the material 13. The tube is stationary and the material is slid over the tube by means of the belt drive as the belt from opposing belt's surfaces 34 and 37 catch the material and move it over the tube 43. Air is introduced into the air tube 43 via the air supply 40 and apertures are provided in the end of the tube for discharge of the air into the interior compartment of each pocket, pouch or cell which is established between the spaced-apart perforated or slotted seal strips 31. As noted previously, the fold line 17 is the bottom of the pocket or pouch and the spaced-apart strips 31 are the sides of the pouch. The top of the pouch is open between the upper ends of the strips 31 so as to receive the discharge from the air tube 43. Also, if desired, a plurality of heat sealed spots, such as spots 44, are provided in spaced-apart relationship between the spaced-apart strips 31. FIG. 8 more clearly shows the inflation of the compartment by introducing the air within air tube 43 through jets or dispensing nozzles 45 into the respective compartments. The closing end of tube 43 is preferably rounded so that it may easily be inserted into the conduit 32 upon initial fabrication. FIG. 9 also illustrates the introduction of the air through the nozzle into the interior compartment broadly identified by numeral 46 between the opposing surfaces of sheets 20 and 21.

Referring now in detail to FIGURES 2 and 10, it can be seen that the upper portion of the sheet 13 is introduced to the heat sections 47 and 48 of the heater 41. A heat seal is made, as indicated by numeral 50, between the adjacent spaced-apart perforated or slotted slits 31 in order to close the compartment 46 and thereby, the air within the compartment is held and cannot be released. The seal is indicated by numeral 50 and when removed from the heat elements 47 and 48 as the material 13 progresses through the machine under control of the belt drive system, the respective in-line inflated pouches or cells progress to a trimming means taking the form of a cutter 51, as shown in FIGURE 2. The cutter severs a portion of the upper bulk material 13 where the conduit 32 would normally be located. Since it is no longer necessary to inflate the internal compartments of the pouches or pockets, the material above the heat seal 50 and the upper fold 18' can be removed and discarded as waste material. The cutter 51 illustrates removal of the excess material and such material is indicated by numeral 52. FIGURE 11 illustrates the bulk material 13 after the compartment has been inflated and the heating means has created the heat seal 50 and the cutter 51 has trimmed the excess material away from the respective in-line pouches or pockets.

FIG. 3 illustrates a completed pouch and one that has been separated from the bulk material 13 by tearing through the line of perforations or slots within the strips 31. Therefore, a plurality of pouches, pockets or cells may be created and may be used for shock-absorbing purposes within a shipping carton or crate. If it is desired to keep two or more pouches together, then the user does not separate the pouches by means of the perforations or slots. The perforations or slots are broadly indicated by numeral 55 in connection with FIG. 2.

Referring now in detail to FIGS. 4 and 5, it can be seen that the pulleys are mounted in a rotatable and downwardly depending position from the support plate 33. For example, pulley 36 is rotatably carried on the end of a shaft 60 which is mounted at its other end in journal bearings such as indicated by numeral 61. The same type of mounting is available for the pulley 36' which turns belt 37. Also, it can be seen that the drive motor 38 is connected to the drive pulley 35 and its associated pulley 35' by means of gearing taking the form of drive gear 62 associated with pulley 35 and drive gear 62' associated with drive pulley 35'. The teeth of gears 62 and 62' are disposed on the opposite sides of the sheet 13 and in particular, in driving connection with the edge marginal region 63 of the stock or bulk material 13. Edge marginal region 63 is immediately adjacent to the folded edge 18' of the bulk sheet material 13. Therefore, as the gears 62 and 62' are rotated, as indicated by the arrows in FIG. 6, the bulk sheet material 13 is carried between the two drive gears and moved into position with respect to the heater 41. Also, the movement draws the air supply pipe 43 into the conduit 32 underneath the fold 18' so that inflation of the compartments in the respective pockets or pouches can be achieved. It is again noted in FIG. 6 that a slight offset is provided so that the sheets 20 and 21 are separated at the edge marginal region 63 to permit inflation when air is supplied from the end of tube 43. This offset separates the opposing surfaces of the two sheets which might normally stick together. FIG. 5 also illustrates the offset relationship between the drive gears 62 and 62'. Also, idler gears or rollers 64 and 65 serve as guides for the tubular bulk material 13 as it is moved between the heater 41 and the idler pulleys 36 and 36'. Therefore, it can be seen that the initial drive movement is provided by the drive gears 62 and 62' while the continued movement of the sheet in its position for performing the respective operative procedures is achieved by the linear portions of the 34 and 37 belts.

Therefore, it can be seen that a plurality of individual pouches, pockets or cells which are inflated to provide shock-absorbing capabilities can be made with the machine shown in the direction of arrow 10. A tubular supply of material 13 is held on a spool 14 and is introduced to the inflation means by the drive gears 62 and 62' and then carried through to the heating element 41 by the belted arrangement gripping both sides of the edge marginal region 63. After heat sealing, the bulk material is introduced to the trimmer 51 and then individual pockets or pouches can be separated from one another by tearing through the perforated or slotted slits in the strips 31. By employing heat seal spots 44, additional cushioning provision for each of the individual pockets or pouches is provided.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A machine for producing inflated pouches or cells in situ to be used as packaging fillers comprising:

a stand having a base plate supporting an upper plate in fixed spaced-apart relationship therewith;

a length of folded or tubular sheet material adapted to move between said base plate and said upper plate from a supply station to a cutter station;

said tubular sheet material being divided into a plurality of open end pouches separated by a seam;

inflation means carried on said upper plate for inflating each of said pouches via said open end;

sealing means carried on said upper plate adjacent to said inflation means for sealing each of said pouch open ends to capture and retain said pouches in an inflated condition;

a cutting element carried on said upper plate adjacent to said sealing means at said cutting station for trimming an edge marginal region of said sheet material adjacent said sealed pouch open ends; and means carried on said upper plate between said inflation means and said supply station for releasably gripping said edge marginal region to advance said sheet material past said inflation means, said sealing means and said cutting means.

2. The machine defined in claim 1 including:

detachable means provided on each of said seams for separating adjacent ones of said pouches from each other.

3. The machine as defined in claim 2 wherein:

said supply of said sheet material is carried on a roll at said supply station.

4. The machine as defined in claim 3 wherein:

said moving means includes a pair of endless belts having external surfaces engageable with opposite sides of said edge marginal region of said sheet material for moving said sheet material between said upper plate and said base plate.

5. A machine for producing inflated pouches or cells in situ to be used as packaging fillers comprising:

a stand having a base plate supporting an upper plate in fixed spaced-apart relationship therewith;

a length of folded or tubular sheet material adapted to move between said base plate and said upper plate from a supply station to a cutter station;

said tubular sheet material being divided into a plurality of open end pouches separated by a seam;

inflation means carried on said upper plate for inflating each of said pouches via said open end;

sealing means carried on said upper plate immediately adjacent to said inflation means for sealing each of said pouch open ends to capture and retain said pouches in an inflated condition;

a cutting element carried on said upper plate adjacent to said sealing means at said cutting station for trimming an edge marginal region of said sheet material adjacent to said sealed pouch open ends;

means carried on said upper plate between said inflation means and said supply station for releasably gripping said edge marginal region to advance said sheet material past said inflation means, said sealing means and said cutting means;

detachable means provided on each of said seams for separating adjacent ones of said pouches from each other;

said supply of said sheet material is carried on a roll at said supply station; and said gripping and advancing means includes a pair of endless belts having external surfaces engageable with opposite edges of said edge marginal region of said sheet material for moving said sheet material between said upper plate and said base plate.

6. A machine for producing inflated pouches of cells in situ with air to be used as packaging fillers comprising:

a stand having a base plate supporting an upper plate in fixed spaced-apart relationship therewith;

a length of folded or tubular sheet material adapted to move between said base plate and said upper plate from a supply station to a cutter station;

said tubular sheet material being divided into a plurality of open end pouches separated by a seam;

air inflation means carried on said upper plate for inflating each of said pouches with air via said open end;

said inflation means includes a source of pressurized air including an air supply conduit terminating with a plurality of discharge orifices;

sealing means carried on said upper plate immediately adjacent to said inflation means for sealing each of said pouch open ends to prevent air from escaping and to capture and retain said pouches in an inflated condition;

a cutting element carried on said upper plate adjacent to said sealing means at said cutting station for trimming an edge marginal region of said sheet material adjacent to said sealed pouch open ends;

means carried on said upper plate between said inflation means and said supply station for releasably gripping said edge marginal region to advance said sheet material past said inflation means, said sealing means and said cutting means;

detachable means provided on each of said seams for separating adjacent ones of said pouches from each other;

said supply of said sheet material is carried on a roll at said supply station; and said gripping and advancing means includes a pair of endless belts having external surfaces engageable with opposite sides of said edge marginal region of said sheet material for moving said sheet material between said upper plate and said base plate.

* * * * *